United States Patent [19]

Yamaguchi

[11] 4,097,687
[45] Jun. 27, 1978

[54] PARTIAL RESPONSE SYSTEM
[75] Inventor: Masaru Yamaguchi, Tokyo, Japan
[73] Assignee: Nippon Electric Co., Ltd., Tokyo, Japan
[21] Appl. No.: 731,960
[22] Filed: Oct. 13, 1976
[30] Foreign Application Priority Data
  Oct. 14, 1975  Japan .................. 50-123922
[51] Int. Cl.² .............................. H04L 3/00
[52] U.S. Cl. ..................................... 178/68
[58] Field of Search ............. 178/68; 325/38 A; 340/347 DD, 347 DA

[56] References Cited

U.S. PATENT DOCUMENTS

| | | | |
|---|---|---|---|
| 3,303,284 | 2/1967 | Lender | 178/68 |
| 3,388,330 | 6/1968 | Kretzmer | 178/68 X |
| 3,829,779 | 8/1974 | Fujimoto | 325/38 A |

*Primary Examiner*—Benedict V. Safourek
*Attorney, Agent, or Firm*—Sughrue, Rothwell, Mion, Zinn and Macpeak

[57] ABSTRACT

A partial response system useful in binary data communication systems is disclosed. The partial response system includes a transmission system adapted to provide an output having a frequency spectrum substantially given by $2j \sin [\omega T/2 \cdot k]$ in response to a single pulse input of pulse width T. A precode-converter is provided at the input side of the transmission system, and a waveform converter is inserted between the pre-code-converter and the transmission system. The frequency spectrum of the output of the waveform converter in response to a single pulse applied to its input is substantially equal to either $2j[(1 - \cos [(\omega/2 \cdot T)])/\omega]$ or $2j(1 - \cos \omega T)/\omega$. The transmission system includes a waveform shaping filter having a transfer function represented substantially by either $$\frac{\omega}{1 - \cos(\frac{\omega}{2} \cdot T)} \cdot \sin(\frac{\omega T}{2} \cdot k) \text{ or}$$

$$\frac{\omega}{1 - \cos \omega T} \cdot \sin(\frac{\omega T}{2} \cdot k).$$

Since the filter characteristic involves only an amplitude-characteristic, the design of the filter is greatly simplified.

5 Claims, 13 Drawing Figures

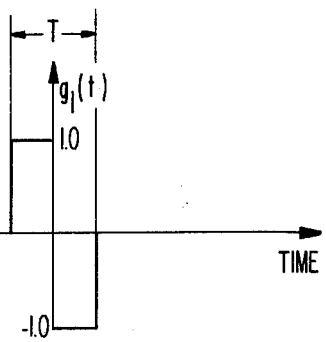
FIG 5
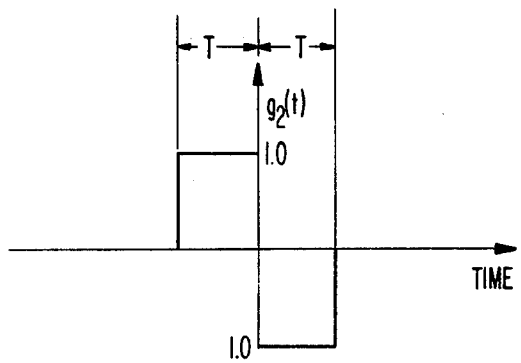
FIG 6
FIG 7
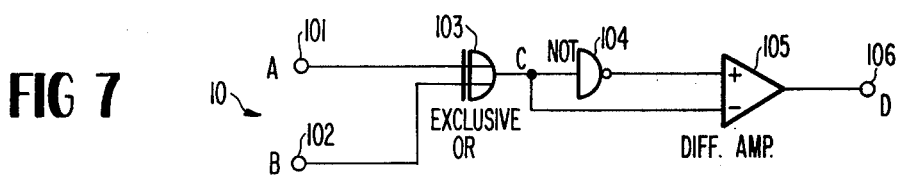
FIG 8
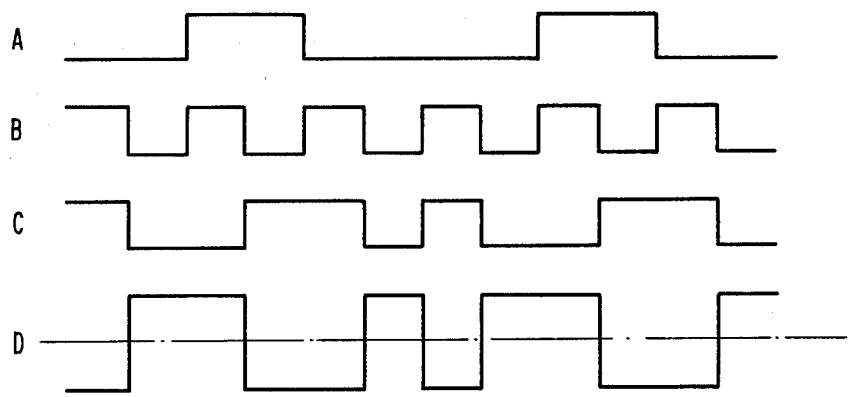
FIG 9
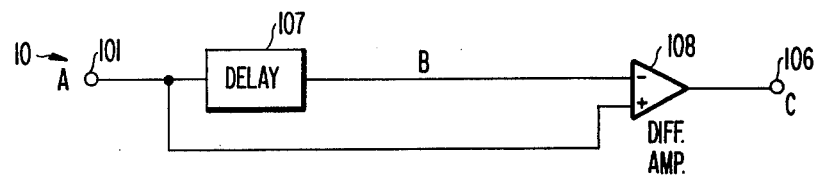

PARTIAL RESPONSE SYSTEM

BACKGROUND OF THE INVENTION

The present invention relates to a partial response system employing a Class-IV waveform (to be described later) and its modified waveform.

A transfer function required for a waveform filter in a partial response system in the prior art is complex, and thus the design of the filter must be made with respect to both amplitude-characteristics and phase-characteristics, so that the filter has a complicated construction. The partial response system is fully described in the following reference article:

(1) E. R. Kretzmer "Generalization of a technique for binary data communication," *IEEE Trans. on Communication Technology*, Vol. COM-14, FEB. 1966, pp. 67 – 68.

It is one object of the present invention to provide a partial response system in which a simple waveform converter is provided on a transmitter side to simplify the design of the waveform shaping filter installed either on a transmitter side or on a receiver side.

FIG. 1 shows a modified waveform of the Class-IV waveform in the partial response system. The abscissa represents time, the ordinate represents an amplitude and T represents one time slot length (reciprocal of the band rate of the transmitted data signals). Assuming that $k = 2$, then the waveform becomes the Class-IV waveform as described in Reference-(1) above, by the following equation:

$$Z(f) = e^{j\omega \frac{T}{2} \cdot k} - e^{-j\omega \frac{T}{2} \cdot k} = 2 \cdot j \sin(\frac{\omega T}{2} \cdot k) \quad (1)$$

where $k$ is a positive integer and $\omega$ is an angular, and $Z(f)$ represents a frequency spectrum of ideal waveform frequency.

FIG. 2 is a block diagram of the partial response system in the prior art, in which reference numeral 1 designates an input terminal to which a bi-level information signal is applied; 2, a pre-code-converter, whose more detailed explanation will be omitted because it is described in detail in Reference-(1) above; 3, a band limit filter, whose transfer function is represented by $P(f)$; 4, a modulator which may be eliminated in case that a modulation-demodulation system is not employed; 5, a transmission line; 6, a demodulator which also may be eliminated in case that a modulation-demodulation system is not employed; 7, a waveform shaping filter, whose transfer function is represented by $R(f)$; 8, an equalizer having frequency-gain characteristics which are opposite to the frequency-loss characteristics of the line within the operating frequency band; and 9, an output terminal.

Assuming now that a frequency spectrum of a single pulse of pulse width T and of amplitude 1, is represented by $S(f)$, according to Reference-(1), we have $$S(f) \cdot P(f) \cdot R(f) = Z(f) \quad (2)$$

Here, if a known low-pass filter is employed for eliminating signals outside of the operating frequency band, we obtain, $$P(f) = 1 \text{ (within the operating frequency band)} \quad (3)$$

and hence, $$S(f) \cdot R(f) = 2j \sin [(\omega T/2) \cdot k] \quad (4)$$

In the heretofore known partial response system, the transmitted signal takes the form of a rectangular wave of 100% duty cycle, and its frequency spectrum $S_1(f)$ is given by $$S_1(f) = (\sin \pi f T)/(\pi f) \quad (5)$$

In this case, the required filter characteristics $R_1(f)$ is given by $$R_1(f) = (\pi f/\sin \pi f T) \cdot 2j \sin [(\omega T/2) \cdot k] \quad (6)$$

As will be apparent from Equation-(6), $R_1(f)$ involves a phase-characteristic in addition to an amplitude-characteristic, so that the filter must be designed with respect to both the phase-characteristic and amplitude-characteristic. As a result, the construction of the filter becomes a complicated one.

BRIEF DESCRIPTION OF THE DRAWINGS

The present invention will now be described in detail with reference to the accompanying drawings wherein:

FIGS. 5 and 6 are representations of waveforms converted by a transmitter-side waveform converter;

FIG. 7 is a circuit diagram showing one example of the transmitter-side waveform converter;

FIGS. 8A through 8D are waveform diagrams for FIG. 7;

FIG. 9 is a circuit diagram showing another example of the transmitter-side waveform converter;

DESCRIPTIONS OF THE PREFERRED EMBODIMENTS

Figure 2:
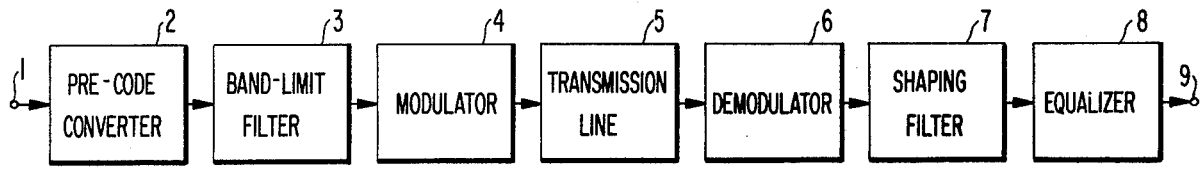
FIG. 2 is a block diagram of a partial response system in the prior art.
Figure 3:
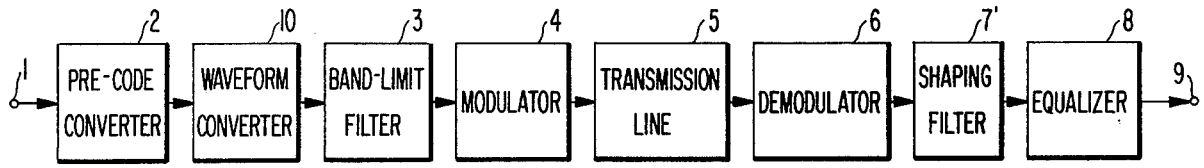
FIG. 3 is a block diagram of a first embodiment according to the present invention.

Referring to FIG. 3, reference numeral 10 designates a waveform converter on a transmitter side; and 7' a waveform shaping filter. The other like reference numerals designate like elements shown in FIG. 2.

Figure 4:
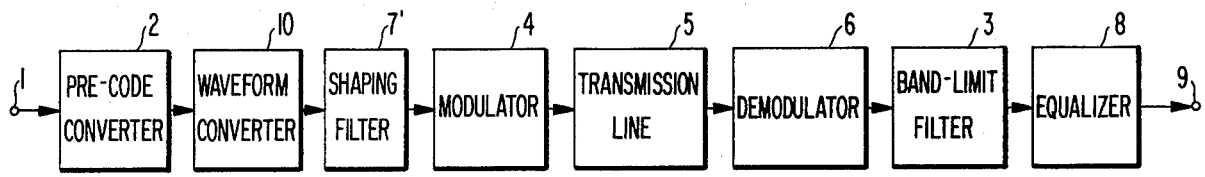
FIG. 4 is a block diagram of a second embodiment according to the present invention.

FIG. 4 shows the second embodiment according to the present invention. It differs from the first embodiment in that a waveform shaping filter 7' is disposed on the transmitter side and a band limit filter 3 is disposed on the receiver side.

The transmitter-side waveform converter 10 has such function that when its input is "1" it converts said input waveform either into a converted waveform $g_1(t)$ as shown in FIG. 5 or into a converted waveform $g_2(t)$ as shown in FIG. 6, and when its input is "0" it converts said input waveform either into a waveform $-g_1(t)$ or into a waveform $-g_2(t)$. Representing the frequency spectra of the waveforms $g_1(t)$ and $g_2(t)$ by $G_1(f)$ and $G_2(f)$, respectively, then we obtain, $$G_1(f) = \int_{-\infty}^{\infty} g_1(t) e^{-j\omega t} dt = 2j \frac{1-\cos\frac{\omega}{2} \cdot T}{\omega} \quad (7)$$

$$G_2(f) = \int_{-\infty}^{\infty} g_2(t) e^{-j\omega t} dt = 2j \frac{1-\cos\omega \cdot T}{\omega} \quad (8)$$

Figure 1:
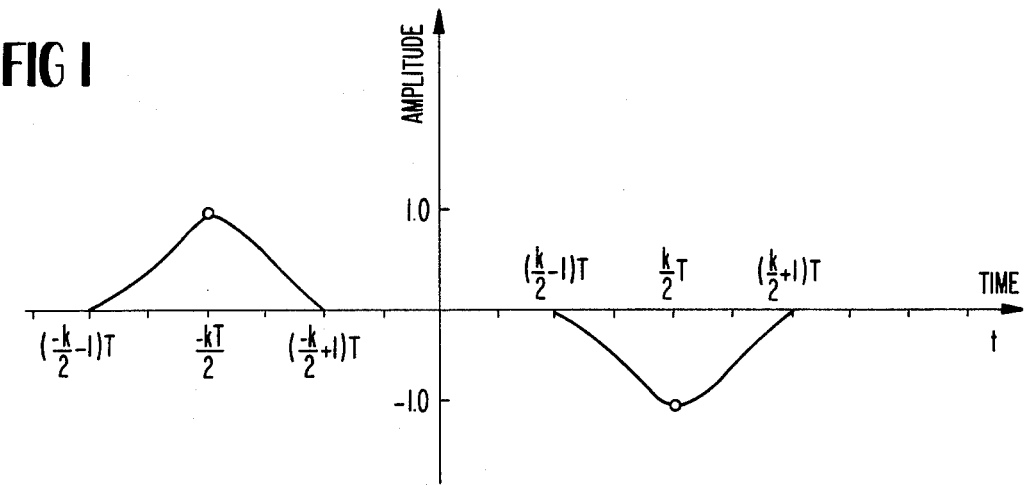
FIG. 1 is representation of a partial response waveform.

Accordingly, if the waveform shaping filter 7' has a function of converting either $G_1(f)$ or $G_2(f)$ into $Z(f)$, then an input signal "1" at the input of the transmitter-side waveform converter 10 would appear at the output of the equalizer 8 as a waveform shown in FiG. 1, while an input signal "0" at the input of the transmitter-side waveform converter 10 would appear at the output of the equalizer 8 as a waveform that is opposite in polarity to the waveform shown in FIG. 1, and thereby a partial response system can be realized.

Representing the transfer functions of the waveform shaping filter 7' corresponding to $G_1(f)$ and $G_2(f)$ by $R_2(f)$ and $R_3(f)$, respectively, we obtain, $$R_2(f) = \frac{Z(f)}{G_1(f)} = \frac{\omega}{1-\cos(\frac{\omega}{2} \cdot T)} \cdot \sin(\frac{\omega T}{2} \cdot k) \quad (9)$$

$$R_3(f) = \frac{Z(f)}{G_2(f)} = \frac{\omega}{1-\cos\omega T} \cdot \sin(\frac{\omega T}{2} \cdot k) \quad (10)$$

Obviously, $R_2(f)$ and $R_3(f)$ have only amplitude-characteristics and do not have phase-characteristics. Therefore, in comparison to the case of $R_1(f)$ represented by Equation-(6), the structure of the receiver filter becomes simpler.

One example of circuit diagram of a transmitter-side waveform converter waveform $g_1(t)$ is shown in FIG. 7. In FIG. 7, reference numeral 101 designates an input terminal to which the output of the pre-code-converter 2 is applied; 102, an input terminal to which a timing signal is applied; 103, an exclusive OR circuit; 104, a NOT circuit; 105, a differential amplifier; and 106, an output terminal. FIGS. 8A through 8D are waveform diagrams for this waveform converter. FIG. 8A represents a data signal applied to the input terminal 101. FIG. 8B represents the timing signal applied to the input terminal 102. In the circuit 103 an exclusive logical sum of both the inputs is taken to deliver the output as shown in FIG. 8C. The output is inverted by the circuit 104. The outputs of the circuits 103 and 104 are affected by a differential amplification by the circuit 105, thereby to deliver the output as shown in FIG. 8D from the output terminal 106.

One example of a circuit diagram of a transmitter-side waveform converter 10 for obtaining the converted waveform $g_2(t)$ is shown in FIG. 9. In FIG. 9, reference numeral 101 designates an input terminal to which the output of the pre-code-converter 2 is applied; 107, a delay circuit having a delay time T; 108, a differential amplifier; and 106, an output terminal.

Figure 10:
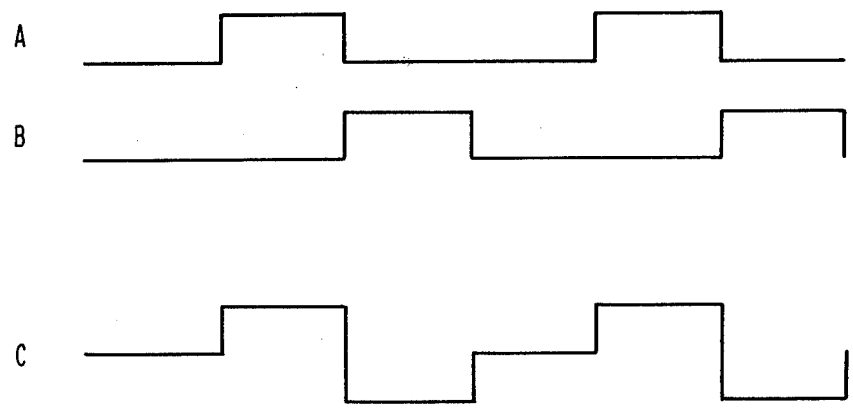
FIGS. 10A through 10C are waveform diagrams for FIG. 9.

FIGS. 10A through 10C are waveform diagrams for the above waveform converter. FIG. 10A represents an input data signal, which is delayed in the circuit 107 by one time slot to obtain the output as shown in FIG. 108. The output and input signals are subjected to differential amplification in the circuit 108, and the output as shown in FIG. 10C is obtained at the output terminal 106.

While the above-mentioned receiver-side filter transfer functions are determined under the condition that $P(f) = 1$ is fulfilled in Equation-(2), in case that another frequency characteristic is imposed to $P(f)$ within the operating frequency band, the following relation is obtained:

$$P(f) \cdot R(f) = Z(f)/S(f) \quad (11)$$

If Equation-(5) is used for $S(f)$, then the right side of Equation-(11) becomes a real function, both the transfer functions $P(f)$ and $R(f)$ can be made real functions, and thus there is no need to take the phase-characteristics of the filter into consideration, so that the structure of the filters for realizing the transfer functions $P(f)$ and $R(f)$ becomes simpler similarly to the above-described case.

A transfer function $E_4(f)$ of the waveform shaping filter 7' in case of $k = 1$ in Equation-(9), is given by the following equation:

$$E_4(f) = \frac{\omega}{1-\cos\frac{\omega}{2} \cdot T} \sin(\frac{\omega T}{2}) \quad (12)$$

Figure 11:
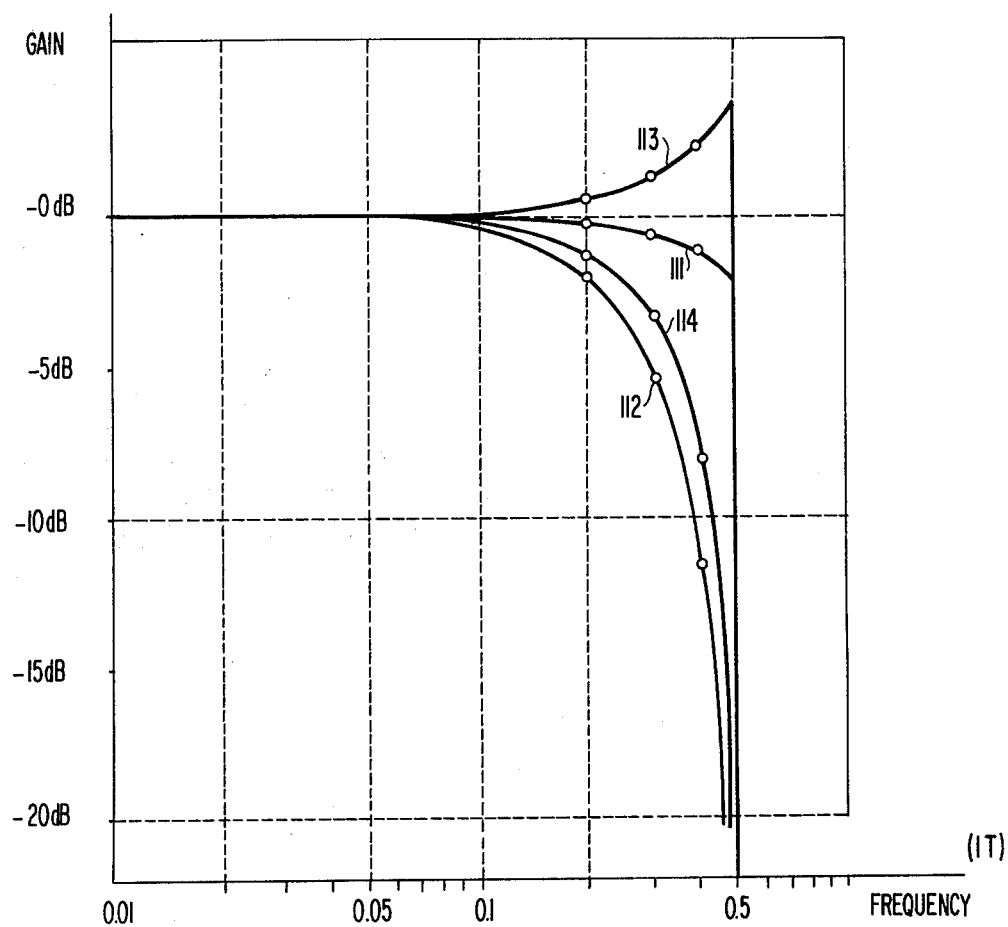
FIG. 11 shows frequency-gain characteristics of the waveform shaping filters.
Figure 12:
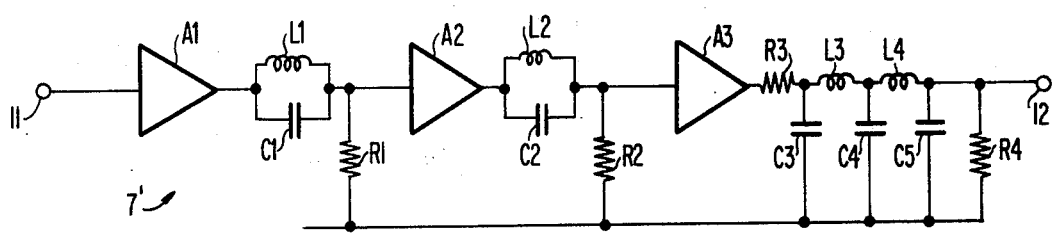
FIG. 12 is a circuit diagram showing one example of the waveform shaping filter.

Frequency-gain characteristic of $E_4(f)$ is depicted by a curve 111 in FIG. 11, and can be approximated with a practically sufficient accuracy by a circuit shown in FIG. 12. The circuit shown in FIG. 12 is composed of a first LC-resonator consisting of L1, C1 and R1, a second LC-resonator consisting of L2, C2 and R2, a fifth-order low-pass filter consisting of L3, L4, C3, C4, C5, R3 and R4, amplifiers A1, A2 and A3, an input terminal 11 and an output terminal 12. In this case, the circuits elements in FIG. 12 take, for example, the following values:

| | |
|---|---|
| R1 = 1 kΩ | R3 = 1 kΩ |
| C1 = 0.0225 μF | R4 = 1 kΩ |
| L1 = 11.2 mH | L3 = 26 mH |
| R2 = 70 Ω | L4 = 26 mH |
| C2 = 0.08 μF | C3 = 0.01 μF |
| L2 = 0.8 mH | C4 = 0.033 μF |
| | C5 = 0.01 μF |

A transfer function $E_5(f)$ of the waveform shaping filter 7' in case of $k = 2$ in Equation-(9), is given by $$E_5(f) = \frac{\omega}{1-\cos(\frac{\omega}{2} T)} \sin(\omega T) \quad (13)$$

Figure 13:
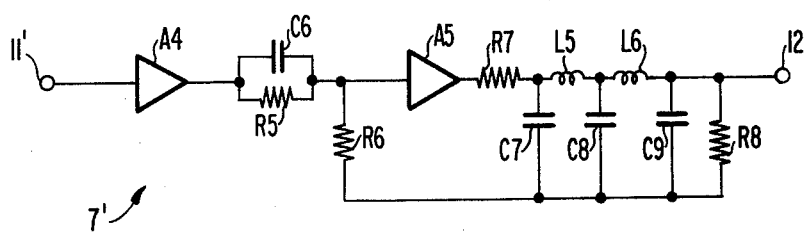
FIG. 13 is a circuit diagram showing another example of the waveform shaping filter.

Frequency-gain characteristic of $E_5(f)$ is depicted by a curve 112 in FIG. 11, and also can be approximated with a practically sufficient accuracy by the circuit shown in FIG. 12. The circuit shown in FIG. 13 is composed of an RC-filter consisting of C6, R5 and R6, a filter consisting of R7, R8, L5, L6, C7, C8 and C9, amplifiers A4 and A5, an input terminal 11 and an output terminal 12. In this case, the circuit elements in FIG. 13 take, for example, the following values:

| | |
|---|---|
| R1 = 1 kΩ | R3 = 1 kΩ |
| C1 = 0.0187 μF | R4 = 1 kΩ |
| L1 = 37.5 mH | L3 = 26 mH |
| R2 = 70 Ω | L4 = 26 mH |
| C2 = 0.08 μF | C3 = 0.01 μF |
| L2 = 0.8 mH | C4 = 0.033 μF |
| | C5 = 0.01 μF |

A transfer function $E_6(f)$ of the waveform shaping filter 7' in case that $k = 1$ is selected in Equation-(10), is given by $$E_6(f) = \frac{\omega}{1 - \cos(\omega T)} \cdot \sin\left(\frac{\omega T}{2}\right) \quad (14)$$

Frequency-gain characteristic of $E_6(f)$ is depicted by a curve 113 in FIG. 11 and also can be approximated with a practically sufficient accuracy by the circuit shown in FIG. 12, although some of the circuit parameters are different from those in the case of $E_4(f)$ or $E_5(f)$. In this case, the circuit elements in FIG. 12 take, for example, the following values:

| | |
|---|---|
| R5 = 1 kΩ | R7 = 1 kΩ |
| R6 = 1 kΩ | R8 = 1 kΩ |
| C6 = 0.016 μF | L5 = 26 mH |
| | L6 = 26 mH |
| | C7 = 0.01 μF |
| | C8 = 0.033 μF |
| | C9 = 0.01 μF |

A transfer function $E_7(f)$ of the waveform shaping filter 7' in case of $k = 2$ in Equation-(10), is given $$E_7(f) = \frac{\omega}{1 - \cos(\omega T)} \cdot \sin(\omega T) \quad (15)$$

Frequency-gain characteristic of $E_7(f)$ is depicted by a curve 114 in FIG. 11 and can be approximated with a practically sufficient accuracy by a circuit shown in FIG. 12. In this case, the circuit elements in FIG. 12 take, for example, the following values:

| | |
|---|---|
| R1 = 1 kΩ | R3 = 1 kΩ |
| C1 = 0.0265 μF | R4 = 1 kΩ |
| L1 = 26.5 mH | L3 = 26 mH |
| R2 = 70 Ω | L4 = 26 mH |
| C2 = 0.08 μF | C3 = 0.01 μF |
| L2 = 0.8 mH | C4 = 0.033 μF |
| | C5 = 0.01 μF |

In FIG. 11, the circle marks on the respective curves show actually measured values under the conditions of the above-mentioned examples where $f_0 = 1/T$ is 10 kHz.

What is claimed is:

1. In a partial response system including a transmission system adapted to provide an output having a frequency spectrum substantially given by $2j \sin((\omega T)/2) \cdot k)$ in response to a single pulse input of pulse width T and of amplitude 1, and a pre-code-converter provided on the input side of said transmission system, thereby to regenerate a bi-level signal applied to the input of said pre-code-converter at the output of said transmission system; the improvement comprising:

a waveform converter inserted between said pre-code-converter and said transmission system, the frequency spectrum of the output of said waveform converter in response to said single pulse applied to the input of said waveform converter being substantially equal to either $2j(1-\cos[(\omega/2) \cdot T])/\omega$ or $2j(1-\cos \omega T)/\omega$, and said transmission system includes a waveform shaping filter connected to the output of the waveform converter and having a transfer function represented substantially by either $$\frac{\omega}{1 - \cos\left(\frac{\omega}{2} \cdot T\right)} \cdot \sin\left(\frac{\omega T}{2} \cdot k\right)$$

or $$\frac{\omega}{1 - \cos \omega T} \cdot \sin\left(\frac{\omega T}{2} \cdot k\right),$$

where T represents one time slot length, $\omega$ represents an angular frequency, and $k$ represents a positive integer.

2. The improved partial response system as recited in claim 1 wherein the frequency spectrum of the output of said waveform converter in response to said single pulse is substantially equal to $2j(1-\cos[(\omega/2) \cdot T])/\omega$ and said waveform converter comprises:

an exclusive OR circuit having first and second input terminals, said first input terminal being connected to receive the output of said pre-code-converter and said second input terminal being connected to receive a timing signal, a NOT circuit connected to the output of said exclusive OR circuit for providing an inverted output, and a differential amplifier having positive and negative inputs, said positive input being connected to the output of said exclusive OR circuit and said negative input being connected to the output of said NOT circuit.

3. The improved partial response system as recited in claim 1 wherein the frequency spectrum of the output of said waveform converter in response to said single pulse is substantially equal to $2j(1-\cos \omega T)/\omega$ and said waveform converter comprises:

a delay circuit having a time delay T connected to receive the output of said pre-code-converter, and a differential amplifier having positive and negative inputs, said positive input being connected to the output of said pre-code-converter and said negative input being connected to the output of said delay circuit.

4. The improved partial response system as recited in claim 1 wherein said waveform shaping circuit comprises:

a first LC resonator and a second LC resonator,
   a low pass filter, and
   a first amplifier connected between said first and second LC resonators and a second amplifier connected between said second LC resonator and said low pass filter.

5. The improved partial response system as recited in claim 1 wherein said waveform shaping circuit comprises:

an RC filter,
   a low pass filter, and
   an amplifier connected between said RC filter and said low pass filter.

* * * * *

UNITED STATES PATENT AND TRADEMARK OFFICE
CERTIFICATE OF CORRECTION

PATENT NO. : 4,097,687
DATED : June 27, 1978
INVENTOR(S) : Masaru YAMAGUCHI

It is certified that error appears in the above-identified patent and that said Letters Patent are hereby corrected as shown below:

IN THE ABSTRACT:

Line 12 - delete "T])" insert -- T)) --

Column 1, line 17 - delete "FEB." insert -- February -- line 38 - after "angular" insert -- frequency -- line 39 - after "waveform" delete "frequency"

Column 2, line 14 - delete Eq. (6) insert $$-- R_1(f) = \frac{\pi f}{\sin \pi fT} \cdot 2j \sin(\frac{\omega T}{2} \cdot k) --$$

Column 3, line 66 - delete "108" insert -- 10B --

Signed and Sealed this

Sixteenth Day of January 1979

[SEAL]

Attest:

RUTH C. MASON
*Attesting Officer*

DONALD W. BANNER
*Commissioner of Patents and Trademarks*